(12) United States Patent
Nakamura et al.

(10) Patent No.: US 11,598,029 B2
(45) Date of Patent: Mar. 7, 2023

(54) METHOD FOR MANUFACTURING OXIDIZED FIBER BUNDLE, METHOD FOR MANUFACTURING CARBON FIBER BUNDLE, AND JOINING APPARATUS

(71) Applicant: TEIJIN LIMITED, Osaka (JP)

(72) Inventors: Yosuke Nakamura, Osaka (JP); Fumio Akiyama, Osaka (JP)

(73) Assignee: TEIJIN LIMITED, Osaka (JP)

( * ) Notice: Subject to any disclaimer, the term of this patent is extended or adjusted under 35 U.S.C. 154(b) by 489 days.

(21) Appl. No.: 16/794,658

(22) Filed: Feb. 19, 2020

(65) Prior Publication Data

US 2020/0263330 A1 Aug. 20, 2020

(30) Foreign Application Priority Data

Feb. 20, 2019 (JP) .............................. JP2019-028908
Jan. 15, 2020 (JP) .............................. JP2020-004158

(51) Int. Cl.
*D01F 9/14* (2006.01)
*D01F 9/22* (2006.01)
(Continued)

(52) U.S. Cl.
CPC ............ *D02J 1/08* (2013.01); *B29C 65/7832* (2013.01); *B29C 66/0242* (2013.01); *B29C 66/69* (2013.01); *B29C 66/72141* (2013.01); *B65H 69/06* (2013.01); *B65H 69/061* (2013.01); *B65H 69/063* (2013.01); *B65H 69/066* (2013.01); *D01F 6/18* (2013.01); *D01F 9/225* (2013.01); *D02J 13/00* (2013.01); *D06M 11/78* (2013.01); *B65H 2701/314* (2013.01);
(Continued)

(58) Field of Classification Search
CPC . B29C 65/7832; B29C 66/0242; B29C 66/69; B29C 66/72141; B65H 69/06; B65H 69/061; B65H 69/063; B65H 69/066; B65H 2701/314; D01F 9/14; D01F 9/22; D01F 9/225; D01F 9/32; D01F 9/328; D02J 1/08; D06M 11/78
USPC ............ 264/29.2, 29.6, 103, 171.13, 211.14; 425/67, 71, 505, 508; 156/158, 502; 423/447.4, 447.6, 447.7; 8/115.6; 28/271; 57/22
See application file for complete search history.

(56) References Cited

U.S. PATENT DOCUMENTS 4,466,949 A * 8/1984 Mori .................... B65H 69/061
423/447.6

FOREIGN PATENT DOCUMENTS

JP 0737686 B2 * 4/1995 ............... D01F 9/14
JP 2015-120582 A 7/2015

OTHER PUBLICATIONS

Translation of JP-0737686-B2 (published on Apr. 26, 1995).*

* cited by examiner

*Primary Examiner* — Leo B Tentoni
(74) *Attorney, Agent, or Firm* — Sughrue Mion, PLLC (57) ABSTRACT

A manufacturing method and an apparatus enable high productivity. A method for manufacturing an oxidized fiber bundle includes joining an upstream precursor fiber bundle and a downstream precursor fiber bundle together with a joining fiber bundle, and oxidizing the joined precursor fiber bundles by feeding the joined precursor fiber bundles through an oxidization furnace. The joining includes applying an oiling agent to a joint area of a joining target precursor fiber bundle before joining the joining target precursor fiber bundle and the joining fiber bundle together. A quantity of (Continued)

the oiling agent adhering to the joint area is 0.15 to 0.85 wt %.

7 Claims, 1 Drawing Sheet (51) Int. Cl.
*D02J 1/08* (2006.01)
*D01F 6/18* (2006.01)
*D02J 13/00* (2006.01)
*D06M 11/78* (2006.01)
*B29C 65/00* (2006.01)
*B29C 65/78* (2006.01)
*B65H 69/06* (2006.01)
*D01F 9/32* (2006.01)
*D06M 101/28* (2006.01)
*D06M 101/40* (2006.01)

(52) U.S. Cl.
CPC ......... *D01F 9/328* (2013.01); *D06M 2101/28* (2013.01); *D06M 2101/40* (2013.01)

METHOD FOR MANUFACTURING OXIDIZED FIBER BUNDLE, METHOD FOR MANUFACTURING CARBON FIBER BUNDLE, AND JOINING APPARATUS

TECHNICAL FIELD

The present invention relates to a method for manufacturing oxidized fiber bundles or carbon fiber bundles, and more particularly, to a method for manufacturing an oxidized fiber bundle or a carbon fiber bundle including a joining process for joining an upstream precursor fiber bundle and a downstream precursor fiber bundle with a joining fiber bundle, and a joining apparatus used in the joining process.

BACKGROUND ART

Carbon fiber bundles have high tensile strength, a high tensile modulus, high heat resistance, and good fatigue characteristics, and thus have various uses in fields such as sports, leisure, aviation, and aerospace.

Carbon fibers are usually produced through an oxidation process for heating bundled carbon-fiber precursor fibers such as acrylic fibers to 200 to 300° C. in an oxidizing atmosphere, and a carbonization process for carbonizing the oxidized fibers in an inert atmosphere.

Such precursor fibers are usually stored in packages such as bobbins or bags. When a package is to be replaced during continuous manufacture, the terminal end of the downstream fiber bundle being fed during the manufacturing process is joined to the start end of an upstream fiber bundle stored in a package.

Patent Literature 1 describes an example fiber bundle joining method for joining upstream and downstream precursor fiber bundles with a joining fiber bundle. However, increases in the rate of production, the linear density of the precursor fiber bundles, and the number of fiber bundles to be processed at a time may cause trouble such as fiber breakage at or near a joint during the oxidization process or the carbonization process, and the productivity is yet to be further improved.

CITATION LIST

Patent Literature

Patent Literature 1: Japanese Unexamined Patent Application Publication No. 2015-120582

SUMMARY OF INVENTION

Technical Problems

One or more aspects of the present invention are directed to a method for manufacturing a carbon fiber bundle with high productivity by joining an upstream precursor fiber bundle and a downstream precursor fiber bundle with a joining fiber bundle, and a fiber bundle joining apparatus for manufacturing a productive fiber bundle.

Solution to Problems

A method for manufacturing an oxidized fiber bundle according to an aspect of the present invention includes joining an upstream precursor fiber bundle and a downstream precursor fiber bundle together with a joining fiber bundle, and oxidizing the joined precursor fiber bundles by feeding the joined precursor fiber bundles through an oxidization furnace. The joining includes applying an oiling agent to a joint area of a joining target precursor fiber bundle before joining the joining target precursor fiber bundle and the joining fiber bundle together. A quantity of the oiling agent adhering to the joint area is 0.15 to 0.85 wt %.

A method for manufacturing a carbon fiber bundle according to another aspect of the present invention includes joining an upstream precursor fiber bundle and a downstream precursor fiber bundle together with a joining fiber bundle, oxidizing the joined precursor fiber bundles by feeding the joined precursor fiber bundles through an oxidization furnace, and carbonizing the oxidized precursor fiber bundles. The joining includes applying an oiling agent to a joint area of a joining target precursor fiber bundle before joining the joining target precursor fiber bundle and the joining fiber bundle together. A quantity of the oiling agent adhering to the joint area is 0.15 to 0.85 wt %.

A joining apparatus according to still another aspect of the present invention is a joining apparatus for joining an upstream fiber bundle and a downstream fiber bundle together with a joining fiber bundle. The apparatus includes an oiling agent application unit that applies an oiling agent to a joining target fiber bundle, a heat-treatment unit that heat-treats the joining target fiber bundle having the oiling agent applied, and a joining unit that causes the heat-treated joining target fiber bundle and the joining fiber bundle to overlap each other, and jets a fluid to the overlap to join the heat-treated joining target fiber bundles and the joining fiber bundle together.

Advantageous Effects of Invention

The method for manufacturing oxidized fibers according to the above aspects of the present invention provides oxidized fibers from which a carbon fiber bundle is produced with high productivity.

The method for manufacturing carbon fibers according to the above aspects of the present invention enables a carbon fiber bundle to be produced in stable processes with high productivity.

The joining apparatus according to the above aspects of the present invention enables a carbon fiber bundle to be produced with high productivity and less trouble at or near a fiber bundle joint.

DESCRIPTION OF EMBODIMENTS

Overview

A carbon fiber bundle is manufactured from precursor fiber bundles formed into oxidized fiber bundles in manufacturing processes including upstream processes for manufacturing precursor fiber bundles and downstream processes for manufacturing a carbon fiber bundle from the precursor fiber bundles.

The precursor fibers manufactured through the upstream processes are temporarily stored on a bobbin or in a carton or a case, and later fed during the downstream processes after being joined to the terminal end of the precursor fiber bundle currently used (fed during the downstream processes). The downstream processes include at least an oxidization process.

The precursor fibers currently used (already fed) in the downstream processes are herein referred to as the downstream precursor fibers, and the precursor fibers joined to the terminal end of the downstream precursor fibers with a joining fiber bundle are herein referred to as the upstream precursor fibers.

A method for manufacturing a carbon fiber bundle according to embodiments of the present invention thus includes a joining process for joining the upstream precursor fiber bundle and the downstream precursor fiber bundle with a joining fiber bundle. In the joining process, the joining target precursor fiber bundles and the joining fiber bundle are joined together after an oiling agent is applied to a joint area of the joining target precursor fiber bundles with the quantity of the adhering oil agent being 0.15 to 0.85 wt %.

This prevents each fiber bundle from breaking at or near the joint during the carbonization process, enabling a carbon fiber to be manufactured with high productivity. The quantity of the adhering oil agent ranging from 0.15 to 0.85 wt % allows the joint to have an entanglement strength of 25 mN/tex or more, with which the fiber bundles are less likely to come off at the joint during processes, thus improving the productivity.

Examples of precursor fibers to form a carbon fiber bundle include pitch fibers, rayon fibers, polyacrylonitrile fibers, and phenol fibers. However, acrylonitrile fibers may be used for their operability, throughput yield, and mechanical strength.

Embodiments

Examples will now be described in which a carbon fiber bundle is manufactured from polyacrylonitrile fiber bundles serving as precursor fiber bundles.

Upstream Processes

1. Overview

A method for manufacturing a precursor fiber bundle (upstream processes) includes at least a polymerization process for producing a polyacrylonitrile polymer and a process for storing a produced precursor fiber bundle on a bobbin or in a carton or a case.

In addition to the polymerization process and the storing process, the method for manufacturing a precursor fiber bundle may also include other processes as appropriate, such as a spinning solution preparation process for preparing a spinning solution, a spinning process for spinning a coagulated fiber from a spinning solution, a washing and stretching process for repeatedly washing and stretching a coagulated fiber bundle, an oiling process for applying an oiling agent to a stretched coagulated fiber bundle, a drying and densification process for drying and densifying an oiled coagulated fiber bundle, a stretching process for further stretching a dried and densified coagulated fiber bundle, and a water application process for applying water to a stretched coagulated fiber bundle. The processes will now be described.

2. Processes (1) Polymerization Process

Any known polyacrylonitrile polymer may be used as a raw material for the polyacrylonitrile fiber bundle. The polyacrylonitrile polymer is formed from a monomer or monomers that may contain 90 wt % or more, and more specifically, 95 to 99 wt % of acrylonitrile, by homopolymerization or copolymerization of such monomers.

The polyacrylonitrile polymer may be a copolymer containing a 90 to 99 wt % acrylonitrile monomer and a 1 to 10 wt % comonomer copolymerizable with acrylonitrile having a vinyl backbone.

Examples of the comonomer copolymerizable with acrylonitrile include acids such as acrylic acid and itaconic acid, and their salts, esters such as methyl acrylate, ethyl acrylate, and methyl methacrylate, and amides such as acrylamide, of which one or a combination of two or more may be used depending on the intended fiber characteristics.

The polyacrylonitrile polymer may result from any known polymerization such as solution, suspension, or emulsion polymerization. The polymerization catalyst used for the polymerization reaction may be any appropriate known catalyst depending on the polymerization. Examples of the catalyst include radical polymerization catalysts such as azo compounds and peroxides, and redox catalysts. For redox catalysts, examples of their reducing agents include sodium bisulfite, ammonium bisulfite, alkyl mercaptans, and ascorbic acid, whereas examples of the oxidizing agents include potassium persulfate, sodium persulfate, ammonium persulfate, sodium chlorite, and hydrogen peroxide.

(2) Spinning Solution Preparation Process

The method for manufacturing a precursor fiber bundle may have spinning from a spinning solution prepared by dissolving the above polyacrylonitrile polymer in a solvent. Any known solvent may be used for the spinning solution, such as an aqueous solution of zinc chloride, sodium thiocyanate, or another inorganic compound or an organic solvent such as dimethylacetamide, dimethylsulfoxide, or dimethylformamide. The solvent used for the spinning solution may or may not be the solvent used in the polymerization process. For the polymerization process having solution polymerization or other polymerization that produces a polymer solution with a polymer dissolved in a solvent, the polymer solution may be used as a spinning solution without precipitation of the polymer.

Although the spinning solution may have any polymer concentration, the quantity of the solvent is adjusted to have the polymer concentration of 3 to 40 wt %, specifically 4 to 30 wt %, and more specifically 5 to 25 wt %. These ranges of polymer concentrations achieve a spinning solution that allows easy spinning and provides internally dense coagulated fibers. An increase in the polymer concentration improves the internal denseness of the coagulated fibers produced in the spinning process, thus achieving precursor fibers to be carbon fibers having high strength. An excessive polymer concentration may increase the viscosity of the spinning solution and reduce the spinning stability.

(3) Spinning Process

The resulting spinning solution is poured through a spinneret and coagulated using a known spinning method to produce a coagulated fiber bundle. The spinning method may be any method appropriate to the type of the solvent used, such as dry spinning, which coagulates the spinning solution in a gas phase, or wet spinning, which coagulates the spinning solution in a coagulation liquid. In this example, wet spinning is used. Wet spinning is divided into wet spinning and dry-wet spinning. In wet spinning, the spinneret is immersed in a coagulation bath, and the spinning solution is discharged and coagulated. In dry-wet spinning, the spinneret is placed above the surface of the liquid in a coagulation bath, and the spinning solution is discharged and passed through the gas phase between the spinneret and the surface of the coagulation liquid and then fed into the coagulation liquid for coagulation. Of the two usable methods, wet spinning may be used, in which the spinneret is immersed in the coagulation bath, and the spinning solution is discharged and coagulated. Wet spinning, in which the spinneret is immersed in the coagulation bath, and the spinning solution is discharged and coagulated, easily provides a precursor fiber bundle and a carbon fiber bundle with a wrinkled surface.

In wet spinning, the coagulation liquid may be an aqueous solution prepared by dissolving in water, a solvent capable of dissolving a polyacrylonitrile polymer. Although the solvent contained in the coagulation liquid may be any one of the above-listed solvents usable for the spinning solution, the solvent may be the same as the solvent for the spinning solution used. The coagulation bath may have any solvent concentration and temperature. For coagulability and spinning stability, the solvent concentration may be 10 to 70 wt % and specifically 15 to 40 wt %, whereas the temperature may be 20 to 60° C. As the solvent concentration in the coagulation bath increases or the temperature decreases, the roundness of the resulting precursor fiber bundle and carbon fiber bundle tends to increase.

The spinneret through which the spinning solution is extruded may have, but not limited to, 1,000 or more spinning holes. More specifically, the spinneret may have 3,000 to 100,000 spinning holes. The number of spinning holes specifies the number of filaments of the coagulated fiber bundle to be produced. The spinning holes may have a pore size of 0.02 to 0.5 mm. The pore size of 0.02 mm or more reduces the possibility of the discharged filaments sticking together, thus providing a highly uniform precursor fiber bundle. The pore size of 0.5 mm or less reduces filament breakage, thus allowing the spinning stability to be maintained easily.

(4) Washing and Stretching Process

The coagulated fiber bundle obtained in the spinning process may be washed and stretched in water or a liquid including solvent. The stretch ratio may be 3 to 15 to increase the throughput yield and productivity. The washing and stretching may be repeated multiple (desirably five or more) times. To distinguish the stretching from the downstream stretching process described later, the stretching in the current process may be referred to as the upstream stretching.

(5) Oiling Process

An oiling agent may be applied to the coagulated fiber bundle after the washing and stretching process. Although the oiling agent may be applied in any appropriate manner, the coagulated fiber bundle is immersed into an oil-containing aqueous solution to place the fiber surface into contact with the oiling agent. The oiling agent may be basically a silicone oil agent for sticking of filaments, heat resistance, and throughput yield.

The silicone oil agent may be amino-modified silicone, epoxy-modified silicone, or ether-modified silicone or a mixture of two or more of these. The oiling agent may also be a non-silicone oiling agent such as an aromatic ester compound, an alkyl ester compound, a polyamide compound, a urethane compound, a phosphate ester compound and a boric acid compound.

The quantity of the adhering oil agent may be 0.01 to 0.5 wt % and specifically 0.03 to 0.3 wt %. The adhering oil agent in quantities within these ranges reduces filament breakage and fuzzy fibers during the subsequent processes and the downstream processes, achieving a high-quality polyacrylonitrile fiber bundle and a carbon fiber bundle with high quality.

(6) Drying and Densification Process

The coagulated fiber bundle after the oiling process may be dried and densified at 70 to 200° C. In the drying and densification, the fiber bundle may be heated using a heated roller with a surface temperature of 70 to 200° C. The drying duration may be one to ten minutes.

(7) (Downstream) Stretching Process

The coagulated fiber bundle having the oiling agent applied or the coagulated fiber bundle after the drying and densification process may be stretched further (downstream stretching). Although the downstream stretching process may have any appropriate stretching method, steam stretching is desirable. The steam stretching may have a saturated steam pressure of 0.01 to 0.5 MPa (absolute pressure) and specifically 0.05 to 0.4 MPa.

The stretch ratio in the steam stretching may be 1.2 to 10, specifically 1.8 to 8, and more specifically 2 to 7. The temperature in the steam stretching may be 105 to 180° C. and specifically 110 to 160° C.

The total stretch ratio through the upstream stretching, drying, and downstream stretching may be 5 to 20 and specifically 10 to 17. The linear density after the steam stretching may be 0.5 to 2 dtex.

The coagulated fiber bundle after the steam stretching may also be heat-treated with a heated roller having a surface temperature of 100 to 200° C.

(8) Water Application Process

Water may be applied to the coagulated fiber bundle after the downstream stretching process to allow the coagulated fiber bundle to have a moisture content of 20 to 50%. Water may be applied by, for example, immersing the coagulated fiber bundle into the water or spraying water onto the coagulated fiber bundle.

(9) Storing Process

The coagulated fiber bundle after the water application process is temporarily stored as precursor fibers with predetermined lengths or weights. The fibers are wound onto bobbins or placed in cartons or cases.

The method for manufacturing a polyacrylonitrile fiber bundle (precursor fiber bundle) provides precursor fiber bundles that form high-quality carbon fiber bundles allowing mass production and having high strength with less filament breakage in the fiber bundles.

Additionally, the precursor fiber bundles form carbon fiber bundles with less fuzzy fibers. More specifically, when the precursor fiber bundles are used to manufacture carbon fiber bundles (in the downstream processes), the carbon fiber bundles are obtained in a stable manufacturing process with no fiber bundle breakage and less filament breakage.

The total linear density of each precursor fiber bundle may be 1,000 to 7,000 tex to increase the strength of the resultant carbon fiber bundle. The filament diameter of the precursor fiber bundle may be 7 to 12 μm.

The use of the resultant polyacrylonitrile fiber bundles as the precursor fiber bundles for a carbon fiber bundle improves the manufacturing throughput yield and the productivity of the carbon fiber bundle.

Downstream Processes

1. Overview

A method for manufacturing a carbon fiber bundle from precursor fiber bundles (downstream processes) includes the oxidization process and the carbonization process, and may further include other processes as appropriate, such as a surface-treatment process for improving the surface of the carbonized fiber and a sizing process for applying (adding) a sizing agent to the carbonized fiber. Additionally, the method may include a graphitization process following the carbonization process. The processes will now be described.

2. Processes (1) Oxidization Process

Each precursor fiber bundle is oxidized in an oxidizing atmosphere (heated air) at 200 to 280° C. The oxidization causes a cyclization reaction in the precursor fiber molecules, increasing oxygen bonds. The precursor fiber bundle becomes infusible and flame-retarded, providing acrylic oxidized fibers.

The oxidization process may include a pre-oxidization process for performing oxidation in an upstream area in the feeding direction of precursor fiber bundles (near the end at which precursor fiber bundles are processed first) at lower temperatures within the above temperature range, and a main oxidization process for performing oxidation in a downstream area at higher temperatures within the above temperature range. The pre-oxidization process facilitates the cyclization reaction further. The temperature of the pre-oxidization process may be 200 to 250° C., and the temperature of the main oxidization process may be 230 to 280° C.

The precursor fiber bundle may be oxidized while being stretched at a stretch ratio of 0.9 to 1.2. More specifically, the stretch ratio in the pre-oxidization process may be 1.0 to 1.2, and the stretch ratio in the main oxidization process may be 0.9 to 1.1.

The oxidization may be continued until the density of the oxidized fiber bundle reaches 1.33 to 1.40 g/cm$^3$. The oxidized fiber bundle having a density within the range provides a carbon fiber bundle with higher strength.

(2) Carbonization Process

The oxidized fiber bundle is carbonized in an inert atmosphere at a maximum temperature of 300 to 1,800° C. The carbonization process may include a first carbonization process in an upstream area with a maximum temperature of 300 to 800° C., and a second carbonization process in a downstream area with a maximum temperature of 500 to 1,800° C. The separate processes facilitate the carbonization. Additionally, the carbonization process may include a third carbonization process with a maximum temperature higher than in the second carbonization process.

The carbonization may be performed with the fiber bundle under tension. More specifically, a tension of 50 to 200 mg/dtex may be applied during the first carbonization process, and a tension of 50 to 1,000 mg/dtex may be applied during the second carbonization process. The application of tension within these ranges provides a carbon fiber bundle with higher strength.

(3) Surface-Treatment Process

The carbonized fiber bundle undergoes surface oxidation in a gas phase or a liquid phase. For productivity and ease of process control, liquid-phase treatment is desirable. In particular, the liquid-phase treatment may be electrolytic treatment with an electrolytic solution for the liquid safety and stability.

(4) Sizing Process

The surface-treated fiber bundle undergoes sizing as appropriate. The sizing process may be performed using a known method, and with any known sizing agent appropriate for use. After applied uniformly, the sizing agent may be dried.

The downstream processes, or the processes for manufacturing a carbon fiber bundle from precursor fiber bundles, provide high productivity with less process trouble such as fiber bundle breakage. The resultant high-grade carbon fiber bundle has less filament breakage and is less fuzzy.

Joining Process

1. Overview

In the joining process, an upstream precursor fiber bundle and a downstream precursor fiber bundle are joined together with a joining fiber bundle. Although an upstream precursor fiber bundle will be described as to be joined, the same may apply to a downstream precursor fiber bundle.

The joining process includes at least an oiling process for applying an oiling agent to upstream precursor fibers with the quantity of the adhering oil agent being 0.15 to 0.85 wt % at a joint area of the upstream precursor fiber bundle, and a splice process for joining the upstream precursor fibers having the oiling agent applied and a joining fiber bundle.

The joining process may further include a heat treatment process between the oiling process and the splice process, for heat-treating the upstream precursor fibers having the oiling agent applied. The joining process is performed with, for example, a joining apparatus.

The processes and the joining apparatus will now be described.

2. Processes (1) Oiling Process

Although the oiling agent may be applied in any appropriate manner, the fiber bundle may be placed into contact with an oil-containing solution. Specific examples of such methods include a touch roll method and an immersion method. The touch roll method includes immersing a part of a roll in an oiling solution to transfer the solution on the roll surface, and then placing the fiber bundle into contact with the roll for the oiling solution to adhere. The immersion method includes immersing the fiber bundle directly into the oiling solution.

The oiling agent may be basically a silicone oil agent with sticking of filaments, heat resistance, and throughput yield. The silicone oil agent may be amino-modified silicone, epoxy-modified silicone, or ether-modified silicone or a mixture of two or more of these.

The quantity of the adhering oil agent, together with the oiling agent applied during the oiling process included in the upstream processes, may be 0.15 to 0.85 wt %, specifically 0.2 to 0.7 wt %, and more specifically 0.3 to 0.6 wt %. The adhering oil agent in quantities within these ranges reduces filament breakage during the subsequent oxidization and carbonization processes, enabling the manufacture of the carbon fiber bundle with high productivity. The adhering oil agent in quantities within these ranges also provides sufficiently high entanglement strength to the joint. An excessive adhering oil agent may reduce the frictional force of the fiber surface and the entanglement strength of the joint, and the joint cannot withstand the tension applied during the processes and may easily come off.

The silicone oil agent is effective in increasing the carbonization throughput yield by preventing filaments from agglomerating to one another at the joint during the oxidization process. However, as the quantity of the adhering silicone oil agent increases, more silicon oxide is produced during the oxidization and carbonization processes. The silicon oxide accumulated during each process may cause a furnace blockage in the exhaust vent or at the fiber inlet or outlet, or other issues. Although such issues can be avoided by, for example, frequent cleaning during manufacture or shortening of the continuous operation period, that may lower the production yield and the capacity utilization ratio.

In one or more embodiments of the present invention, the quantity of the oiling agent adhering to the non-joint area of a precursor fiber bundle may be 0.01 to 0.5 wt %, and specifically 0.03 to 0.3 wt %. The quantity of the oiling agent additionally applied to the joint area of the precursor fiber bundle may be 0.05 to 0.8 wt %, and specifically 0.1 to 0.65 wt %.

In the joining process included in the method for manufacturing a carbon fiber according to one or more embodiments of the present invention, the oiling agent may be additionally applied to the joint area including the joint alone to prevent the joint from agglomerating. When the additional oiling agent application is limited to the joint area, the quantity of the oiling agent adhering to the non-joint area remains small. With the small quantity of the oiling agent adhering to the non-joint area of a precursor fiber bundle, the production of silicon oxide remains less during the oxidization and carbonization processes, thus preventing a blockage in a portion of each furnace in the exhaust vent or with the fiber bundle being fed during the manufacturing operation as well as an increase in time for cleaning. This maintains the continuous operability and the production yield and the capacity utilization ratio are prevented from being lowered.

The quantity of the adhering oil agent is controlled by changing the concentration in the solution stored in the oiling bath. More specifically, as the concentration of the oil agent increases in the solution contained in the oiling bath, the quantity of the adhering oil agent tends to increase. Thus, the quantity of the oiling agent adhering to the fiber bundle can be controlled by adjusting the concentration in the oiling solution. The quantity also depends on the type, the linear density, and the immersion duration of precursor fibers and the speed of the precursor fibers passing through the oiling bath.

(2) Heat Treatment Process

In one or more embodiments of the present invention, the precursor fiber bundle having the oiling agent applied in the oiling process may be heat-treated before joined to the joining fiber bundle. Although the heat treatment may be performed in any appropriate manner, examples of such methods include a method for passing the precursor fiber bundle through a heating furnace set at a predetermined temperature, a method for blowing hot air onto the precursor fiber bundle being passed, and a method for placing the precursor fiber bundle into contact with a heated plate and a heated roller.

The heat treatment temperature may be 220 to 300° C., and specifically 240 to 290° C. The heat treatment duration may be two to ten minutes, and specifically three to eight minutes. The heat treatment may cause the density of the precursor fiber bundle to be 1.19 g/cm$^3$ or more, and specifically 1.19 to 1.25 g/cm$^3$. Such heat treatment increases the entanglement strength between the precursor fiber bundle and the joining fiber bundle and reduces trouble during the oxidization process.

(3) Splice Process

The joining fiber bundle and the downstream precursor fiber bundle are joined together with a first end of the joining fiber bundle joined to the downstream precursor fiber bundle. The joining fiber bundle and the upstream precursor fiber bundle are joined together by forming an overlap between a second end of the joining fiber bundle and the downstream end (start end) of the upstream precursor fiber bundle, and jetting a fluid to the overlap to form one or more entangled portions. The entangled portions may be formed using a known device such as an interlacing nozzle.

For example, an interlacing nozzle is used to jet a fluid through its one or more holes. An overlap is formed between the first end of the joining fiber bundle and a second end of the downstream precursor fiber bundle, which is to be joined, and a fluid is jetted to the overlap to form a first entangled portion. Another overlap is formed between the second end of the joining fiber bundle and a first end of the upstream precursor fiber bundle, which is also to be joined, and a fluid is jetted to the overlap to form a second entangled portion. The joining fiber bundle may be first joined to the upstream precursor fiber bundle. To provide reliable throughput yield, each entangled portion may have a length of 20 to 1,500 mm. The unentangled portion between the entangled portions of the joining fiber bundle may have a length of 10 to 800 mm.

The joining fiber bundle may be a bundle of oxidized fibers, pre-carbonized fibers (with a density of 1.5 to 1.67 g/cm$^3$), carbon fibers, or other fibers, of which the carbon fibers may provide higher entanglement strength to the joint.

3. Joining Apparatus

The joining apparatus joins an upstream precursor fiber bundle and a downstream precursor fiber bundle together with a joining fiber bundle. Although the upstream precursor fiber bundle and the downstream precursor fiber bundle are to be joined, the upstream precursor fiber bundle will be described.

Figure 1:
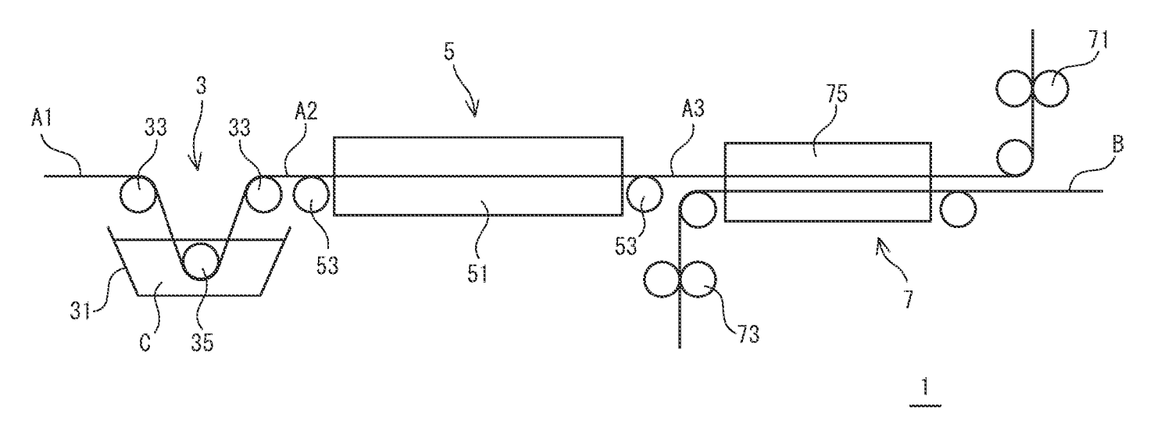
FIG. 1 is a schematic diagram of a joining apparatus.

As shown in FIG. 1, a joining apparatus 1 includes an oiling agent application unit 3 that applies an oiling agent to an upstream precursor fiber bundle A1, a heat-treatment unit 5 that heat-treats an upstream precursor fiber bundle A2 having the oiling agent applied, and a joining unit 7 that causes a heat-treated upstream precursor fiber bundle A3 and a joining fiber bundle B to overlap each other, and jets a fluid to the overlap to join them together.

The oiling agent application unit 3 includes an oiling bath 31 that stores an oil-containing solution C, and rollers 33 and 35 that pass an upstream precursor fiber bundle A1 through the oiling bath 31. The rollers 33 are fixed outside the oiling bath 31, and the roller 35 is allowed to be in or out of the oiling bath 31. The rollers facilitate feeding the upstream precursor fiber bundle A1 into the oiling bath 31.

The heat-treatment unit 5 includes a heating furnace 51 that can be set at a predetermined temperature, and rollers 53 outside the furnace that pass the upstream precursor fiber bundle A2 through the heating furnace 51. The heating furnace 51 may be adapted to blow hot air, to increase the heating rate and temperature controllability, and to prevent fusion of filaments during heat treatment of the precursor fiber bundle. The hot air may be circulated or discharged without being circulated. The hot air may be blown vertically and/or horizontally onto the precursor fiber bundle. The hot air temperature may be 200 to 300° C.

Although a high temperature is desirable for efficiency, the precursor fiber bundle at an excessive treatment temperature may show thermal runaway due to an exothermic (oxidation) reaction and easily break. The treatment duration may be two minutes or more. The heat treatment continuing for at least two minutes pre-promotes the oxidization of the precursor fibers to easily prevent a thermal runaway reaction during the oxidization process. Although the treatment duration may have any upper limit, a ten-minute treatment will produce a sufficiently large effect. The precursor fiber bundle during heat treatment may be contracted by about 1 to 8% for preventing fuzzy fibers.

The joining unit 7 functions as a splicer, and includes supporting units 71 and 73 that support the upstream precursor fiber bundle A3 and the joining fiber bundle B overlapping each other, and a blow unit 75 having an interlacing nozzle that blows compressed air, which is an example fluid, onto the upstream precursor fiber bundle A3 and the joining fiber bundle B overlapping each other. Blowing the compressed air forms an entangled portion. To form multiple entangled portions, the interlacing nozzle may be moved along the fibers or multiple interlacing nozzles may be used.

In the oiling agent application unit 3, the oiling agent concentration in the solution is adjusted to allow the quantity of the oiling agent adhering to the joint area of the upstream precursor fiber bundle A3 to be 0.15 to 0.85 wt %.

EXAMPLES

One or more embodiments of the present invention will now be described using examples and comparative examples. The quantity of the adhering oiling agent, the tensile test for the joint, and the throughput yield in the examples and comparative examples are described below.

Quantity of Adhering Oil Agent

About 2 g of a precursor fiber bundle was extracted and dried at 105° C. for one hour. The dried fiber mass ($W_1$) was measured. Then, in accordance with the Soxhlet extraction method using methyl ethyl ketone, the precursor fiber bundle was immersed in methyl ethyl ketone at 90° C. for eight hours to remove the adhering oil agent by solvent extraction, and then dried at 105° C. for one hour. The dried fiber mass ($W_2$) was measured, and the quantity of the adhering oil agent was calculated in accordance with the equation below.

Quantity of adhering oil agent (wt %)=$(W_1-W_2)/W_1 \times 100$

Entanglement Strength

An end of the precursor fiber bundle was entangled with an end of the joining fiber bundle, and with both 150-mm ends from the entangled portion left, surplus filaments were cut to prepare a fiber bundle having a joint. In this process, one entangled portion was formed (air is blown at one position). Then, paper tabs to be pinched by a tensile tester were attached to both 50-mm ends of the fiber bundle to form a test piece with a total length of 320 mm. The test piece underwent a tensile test with AUTOGRAH AG-X 100 kN (Shimadzu Corporation) at a tensile testing speed of 20 mm/min to measure the maximum load. The measured maximum load (mN) was divided by the linear density (tex) of the entangled portion (specifically, the total linear density of the precursor fiber bundle and the joining fiber bundle) to determine the entanglement strength per linear density (mN/tex).

Throughput Yield

The throughput yield refers to the percentage of fiber bundles that have successfully passed through each of the oxidization process and the carbonization process without having breaks at their joints.

Example 1

Example 11

A copolymer spinning solution containing 95 wt % of acrylonitrile, 4 wt % of methyl acrylate, and 1 of wt % itaconic acid was discharged through a spinneret into a zinc chloride aqueous solution and coagulated to produce coagulated filaments. The coagulated filaments were washed and stretched, and then a 0.06 wt % amino-modified silicone oil agent was applied to the filaments as a spinning oil agent to produce acrylonitrile precursor fiber bundles each having 24,000 filaments and a fiber bundle linear density of 3,067 tex. A carbon fiber bundle without sizing agent applied and a fiber bundle linear density of 3,200 tex was used as a joining fiber bundle.

Two of the precursor fiber bundles were joined together with the joining fiber bundle using the joining apparatus 1. An oiling bath contained a solution with an oiling agent concentration of 10 g/L, and the oiling agent was applied to the joint areas of the precursor fiber bundles with the total quantity of the adhering oil agent and the spinning oil agent being 0.25 wt %. An amino-modified silicone oil agent was used as the oiling agent. The precursor fiber bundles after the oiling agent application were heat-treated at 280° C. for five minutes. The joint between the upstream precursor fiber bundle and the joining fiber bundle, and the joint between the joining fiber bundle and the downstream precursor fiber bundle each received blowing compressed air for 10 sec in the splice process to form eight entangled portions.

The joints between the precursor fiber bundles and the joining fiber bundle joined in this manner show an entanglement strength of 120 mN/tex in the joint tensile test.

The fiber bundles joined as described above were oxidized in an oxidizing atmosphere. The oxidization process includes pre-oxidization at 230 to 260° C. and a stretch ratio of 1.04, followed by main oxidization at 240 to 270° C. and a stretch ratio of 1.0. The resultant oxidized fiber bundles were fed into a first carbonization furnace with the maximum temperature set at 600° C. and then passed through a second carbonization furnace with the maximum temperature set at 1,500° C. The throughput yields were 100% in the oxidization process and 90% in the carbonization process.

Table 1 summarizes the conditions, the quantities of the adhering oil agent, the entanglement strength, and the throughput yields.

The conditions in the upstream processes, the oiling agent and the moisture content of the precursor fibers in the upstream processes, the conditions in the heat treatment process and the splice process in the joining process, and the oxidization process and the carbonization process in the downstream processes are common among all examples and comparative examples, and will not be listed in Table 1 or described in the examples and comparative examples.

Example 12

The same precursor fiber bundles and the same joining fiber bundle as used in example 11 were used in this example. Example 12 is the same as example 11 except that the oiling agent concentration was 20 g/L and the quantity of the adhering oil agent was 0.45 wt % in the joining process.

Table 1 summarizes the conditions, the quantities of the adhering oil agent, the entanglement strength, and the throughput yields.

Example 13

The same precursor fiber bundles and the same joining fiber bundle as used in example 11 were used in this example. Example 13 is the same as example 11 except that the oiling agent concentration was 30 g/L and the quantity of the adhering oil agent was 0.65 wt % in the joining process.

Table 1 summarizes the conditions, the quantities of the adhering oil agent, the entanglement strength, and the throughput yields.

Example 2

Example 21

The precursor fiber bundles used were acrylonitrile precursor fibers having a fiber bundle linear density of 1,733 tex, a 0.06 wt % adhering spinning oil agent, and 24,000 filaments. A carbon fiber bundle without sizing agent applied and a fiber bundle linear density of 1,600 tex was used as the joining fiber bundle.

Example 21 is the same as example 11 except that the oiling agent concentration was 10 g/L and the quantity of the adhering oil agent was 0.25 wt % in the joining process.

Table 1 summarizes the conditions, the quantities of the adhering oil agent, the entanglement strength, and the throughput yields.

Example 22

The same precursor fiber bundles and the same joining fiber bundle as used in example 21 were used in this example. Example 22 is the same as example 21 except that the oiling agent concentration was 20 g/L and the quantity of the adhering oil agent was 0.45 wt % in the joining process.

Table 1 summarizes the conditions, the quantities of the adhering oil agent, the entanglement strength, and the throughput yields.

Example 23

The same precursor fiber bundles and the same joining fiber bundle as used in example 21 were used in this example. Example 23 is the same as example 21 except that the oiling agent concentration was 30 g/L and the quantity of the adhering oil agent was 0.65 wt % in the joining process.

Table 1 summarizes the conditions, the quantities of the adhering oil agent, the entanglement strength, and the throughput yields.

Example 3

Example 31

The precursor fiber bundles used were acrylonitrile precursor fibers having a fiber bundle linear density of 3,093 tex, a 0.06 wt % adhering spinning oil agent, and 48,000 filaments. A carbon fiber bundle without sizing agent applied and a fiber bundle linear density of 3,200 tex (the same as used in example 1) was used as the joining fiber bundle.

Example 31 is the same as example 11 except that the oiling agent concentration was 10 g/L and the quantity of the adhering oil agent was 0.25 wt % in the joining process.

Table 1 summarizes the conditions, the quantities of the adhering oil agent, the entanglement strength, and the throughput yields.

Example 32

The same precursor fiber bundles and the same joining fiber bundle as used in example 31 were used in this example. Example 32 is the same as example 31 except that the oiling agent concentration was 20 g/L and the quantity of the adhering oil agent was 0.45 wt % in the joining process.

Table 1 summarizes the conditions, the quantities of the adhering oil agent, the entanglement strength, and the throughput yields.

Example 33

The same precursor fiber bundles and the same joining fiber bundle as used in example 31 were used in this example. Example 33 is the same as example 31 except that the oiling agent concentration was 30 g/L and the quantity of the adhering oil agent was 0.65 wt % in the joining process.

Table 1 summarizes the conditions, the quantities of the adhering oil agent, the entanglement strength, and the throughput yields.

Example 4

Example 41

The precursor fiber bundles used were acrylonitrile precursor fibers having a fiber bundle linear density of 2,800 tex, a 0.15 wt % adhering spinning oil agent, and 24,000 filaments. Example 41 is the same as example 11 except that no additional oiling agent was applied in the joining process (with the same quantity of the adhering oil agent as a spinning oil agent in the upstream processes) and the quantity of the adhering oil agent remained at 0.15 wt % as in the upstream processes.

Table 1 summarizes the conditions, the quantities of the adhering oil agent, the entanglement strength, and the throughput yields.

Example 42

The same precursor fiber bundles and the same joining fiber bundle as used in example 41 were used in this example. Example 42 is the same as example 41 except that the oiling agent concentration was 10 g/L and the quantity of the adhering oil agent was 0.4 wt % in the joining process.

Table 1 summarizes the conditions, the quantities of the adhering oil agent, the entanglement strength, and the throughput yields.

Example 43

The same precursor fiber bundles and the same joining fiber bundle as used in example 41 were used in this example. Example 43 is the same as example 41 except that the oiling agent concentration was 20 g/L and the quantity of the adhering oil agent was 0.6 wt % in the joining process.

Table 1 summarizes the conditions, the quantities of the adhering oil agent, the entanglement strength, and the throughput yields.

Example 5

Example 51

The precursor fiber bundles used were acrylonitrile precursor fibers having a fiber bundle linear density of 2,800 tex, a 0.15 wt % adhering spinning oil agent, and 24,000 filaments, as used in Example 41.

The same acrylonitrile precursor fiber bundle (24,000 filaments, the total fiber bundle linear density of 2,800 tex, the moisture content of 35 wt %) underwent pre-oxidization in an oxidizing atmosphere at 230 to 260° C. and a stretch ratio of 1.04, followed by main oxidization at 240 to 270° C. and a stretch ratio of 1.0. The resultant oxidized fiber bundle was fed into the first carbonization furnace with a maximum temperature set at 600° C. and carbonized until the fiber density reached 1.57 g/cm$^3$ to produce a pre-carbonized fiber bundle having a fiber bundle linear density of 2,100 tex. The resultant pre-carbonized fiber bundle was used as joining fiber bundle.

In the joining process, no additional oiling agent was applied, and the quantity of the adhering oil agent remained at 0.15 wt % as in the upstream processes. In other words, example 51 is the same as example 41 except that the joining fiber bundle was a pre-carbonized fiber bundle.

Table 1 summarizes the conditions, the quantities of the adhering oil agent, the entanglement strength, and the throughput yields.

Example 52

The same precursor fiber bundles and the same joining fiber bundle as used in example 51 were used in this example. Example 52 is the same as example 51 except that the oiling agent concentration was 10 g/L and the quantity of the adhering oil agent was 0.4 wt % in the joining process. In other words, example 51 is the same as example 42 except that the joining fiber bundle was a pre-carbonized fiber bundle.

Table 1 summarizes the conditions, the quantities of the adhering oil agent, the entanglement strength, and the throughput yields.

Example 53

The same precursor fiber bundles and the same joining fiber bundle as used in example 51 were used in this example. Example 53 is the same as example 51 except that the oiling agent concentration was 20 g/L and the quantity of the adhering oil agent was 0.6 wt % in the joining process. In other words, example 53 is the same as example 43 except that the joining fiber bundle was a pre-carbonized fiber bundle.

Table 1 summarizes the conditions, the quantities of the adhering oil agent, the entanglement strength, and the throughput yields.

Example 54

The same precursor fiber bundles and the same joining fiber bundle as used in example 51 were used in this example. Example 54 is the same as example 51 except that the oiling agent concentration was 30 g/L and the quantity of the adhering oil agent was 0.8 wt % in the joining process.

Table 1 summarizes the conditions, the quantities of the adhering oil agent, the entanglement strength, and the throughput yields.

Example 6

Example 61

The precursor fiber bundles used were acrylonitrile precursor fiber bundles having a fiber bundle linear density of 2,800 tex, a 0.15 wt % adhering spinning oil agent, and 24,000 filaments (the same as used in examples 41 and 51).

The same acrylonitrile precursor fiber bundle (24,000 filaments, the total fiber bundle linear density of 2,800 tex, the moisture content of 35 wt %) underwent pre-oxidization in an oxidizing atmosphere at 230 to 260° C. and a stretch ratio of 1.04, followed by main oxidization at 240 to 270° C. and a stretch ratio of 1.0 to produce an oxidized fiber bundle having a fiber bundle linear density of 3,000 tex. The resultant oxidized fiber bundle was used as a joining fiber bundle.

In the joining process, no oiling agent was applied, and the quantity of the adhering oil agent remained at 0.15 wt % as in the upstream processes. In other words, example 61 is the same as examples 41 and 51 except that the joining fiber bundle was an oxidized fiber bundle.

Table 1 summarizes the conditions, the quantities of the adhering oil agent, the entanglement strength, and the throughput yields.

Example 62

The same precursor fiber bundles and the same joining fiber bundle as used in example 61 were used in this example. Example 62 is the same as example 61 except that the oiling agent concentration was 10 g/L and the quantity of the adhering oil agent was 0.4 wt % in the joining process.

Table 1 summarizes the conditions, the quantities of the adhering oil agent, the entanglement strength, and the throughput yields.

Example 63

The same precursor fiber bundles and the same joining fiber bundle as used in example 61 were used in this example. Example 63 is the same as example 61 except that the oiling agent concentration was 20 g/L and the quantity of the adhering oil agent was 0.6 wt % in the joining process. In other words, example 63 is the same as examples 43 and 53 except that the joining fiber bundle was an oxidized fiber bundle.

Table 1 summarizes the conditions, the quantities of the adhering oil agent, the entanglement strength, and the throughput yields.

Example 64

The same precursor fiber bundles and the same joining fiber bundle as used in example 61 were used in this example. Example 64 is the same as example 61 except that the oiling agent concentration was 30 g/L and the quantity of the adhering oil agent was 0.8 wt % in the joining process. In other words, example 64 is the same as example 54 except that the joining fiber bundle was an oxidized fiber bundle.

Table 1 summarizes the conditions, the quantities of the adhering oil agent, the entanglement strength, and the throughput yields.

Example 7

Example 71

The precursor fiber bundles used were acrylonitrile precursor fiber bundles having a fiber bundle linear density of 2,800 tex, a 0.15 wt % adhering spinning oil agent, and 24,000 filaments (the same as used in examples 41, 51, and 61). A carbon fiber bundle without sizing agent applied and a fiber bundle linear density of 3,000 tex was used as the joining fiber bundle.

In the joining process, the oiling agent was applied to the joint areas of the precursor fiber bundles in the same manner as in examples 43, 53, and 63. Example 71 is the same as examples 43, 53, and 63 except that the precursor fiber bundles after the oiling agent application were heat-treated at 280° C. for one minute.

Table 1 summarizes the conditions, the quantities of the adhering oil agent, the entanglement strength, and the throughput yields.

Example 72

The same precursor fiber bundles and the same joining fiber bundle as used in example 71 were used in this example. Example 72 is the same as example 71 except that the precursor fiber bundles after the oiling agent application were heat-treated at 280° C. for three minutes in the joining process.

Table 1 summarizes the conditions, the quantities of the adhering oil agent, the entanglement strength, and the throughput yields.

Example 73

The same precursor fiber bundles and the same joining fiber bundle as used in example 71 were used in this example. Example 73 is the same as example 71 except that the precursor fiber bundles after the oiling agent application were heat-treated at 280° C. for five minutes in the joining process.

Table 1 summarizes the conditions, the quantities of the adhering oil agent, the entanglement strength, and the throughput yields.

Example 74

The same precursor fiber bundles as used in example 71 was used in this example. A carbon fiber bundle with 1 wt % of an epoxy resin sizing agent applied was used as the joining fiber bundle. In the joining process, oiling agent application and heat treatment were performed under the same conditions as in example 73. Without using a splice apparatus, the fiber bundles were joined together by braiding the heat-treated precursor fiber bundles into 50-cm ends of the joining fiber bundle. The carbon fiber bundle was manufactured in the same manner as in example 73 except for the joining method and the sizing agent adhering to the joining fiber bundle.

Table 1 summarizes the conditions, the quantities of the adhering oil agent, the entanglement strength, and the throughput yields.

Comparative Example 1

Comparative Example 11

The same precursor fiber bundles and the same joining fiber bundle as used in example 11 were used in this comparative example. Comparative example 11 is the same as example 11 except that no oiling agent was applied in the joining process (with the same quantity of the adhering oil agent, 0.06 wt %, as in the upstream processes).

Table 1 summarizes the conditions, the quantities of the adhering oil agent, the entanglement strength, and the throughput yields.

Comparative Example 12

The same precursor fiber bundles and the same joining fiber bundle as used in example 11 were used in this comparative example. Comparative example 12 is the same as example 11 except that the oiling agent concentration was 50 g/L and the quantity of the adhering oil agent was 1.05 wt % in the joining process.

Table 1 summarizes the conditions, the quantities of the adhering oil agent, the entanglement strength, and the throughput yields.

In comparative example 12, the excessive adhering oil agent caused insufficient entanglement strength. The fiber bundles had a significantly low throughput yield of the oxidization process of 40%, failing to achieve a sufficiently high throughput yield.

Comparative Example 2

Comparative Example 21

The same precursor fiber bundles and the same joining fiber bundle as used in example 21 were used in this comparative example. Comparative example 21 is the same as example 21 except that no oiling agent was applied in the joining process (with the same quantity of the adhering oil agent, 0.06 wt %, as in the upstream processes).

Table 1 summarizes the conditions, the quantities of the adhering oil agent, the entanglement strength, and the throughput yields.

Comparative Example 22

The same precursor fiber bundles and the same joining fiber bundle as used in example 21 were used in this comparative example. Comparative example 22 is the same as example 21 except that the oiling agent concentration was 50 g/L and the quantity of the adhering oil agent was 1.05 wt % in the joining process.

Table 1 summarizes the conditions, the quantities of the adhering oil agent, the entanglement strength, and the throughput yields.

Comparative Example 3

Comparative Example 31

The same precursor fiber bundles and the same joining fiber bundle as used in example 31 were used in this comparative example. Comparative example 31 is the same as example 31 except that no oiling agent was applied in the joining process (with the same quantity of the adhering oil agent, 0.06 wt %, as in the upstream processes). Table 1 summarizes the conditions, the quantities of the adhering oil agent, the entanglement strength, and the throughput yields.

Comparative Example 32

The same precursor fiber bundles and the same joining fiber bundle as used in example 31 were used in this comparative example. Comparative example 32 is the same as example 31 except that the oiling agent concentration was 50 g/L and the quantity of the adhering oil agent was 1.05 wt % in the joining process.

Table 1 summarizes the conditions, the quantities of the adhering oil agent, the entanglement strength, and the throughput yields.

Comparative Example 4

Comparative Example 41

The same precursor fiber bundles and the same joining fiber bundle as used in example 41 were used in this comparative example. Comparative example 41 is the same as example 41 except that the oiling agent concentration was 40 g/L and the quantity of the adhering oil agent was 1.0 wt % in the joining process.

Table 1 summarizes the conditions, the quantities of the adhering oil agent, the entanglement strength, and the throughput yields.

Comparative Example 5

Comparative Example 51

The same precursor fiber bundles and the same joining fiber bundle as used in example 51 were used in this comparative example. Comparative example 51 is the same as example 51 except that the oiling agent concentration was 40 g/L and the quantity of the adhering oil agent was 1.0 wt % in the joining process.

Table 1 summarizes the conditions, the quantities of the adhering oil agent, the entanglement strength, and the throughput yields.

Comparative Example 6

Comparative Example 61

The same precursor fiber bundles and the same joining fiber bundle as used in example 61 were used in this comparative example. Comparative example 61 is the same as example 61 except that the oiling agent concentration was 40 g/L and the quantity of the adhering oil agent was 1.0 wt % in the joining process.

Table 1 summarizes the conditions, the quantities of the adhering oil agent, the entanglement strength, and the throughput yields.

TABLE 1

| | Precursor fiber | | | Splice conditions | | | Heat-treatment conditions | |
| | | | | Oiling conditions | | | | |
| | Total linear density tex | Filament count No. | Adhering spinning oil agent wt % | Oiling bade concentration g/L | Total adhering oil agent wt % | Additional adhering oil agent wt % | Duration min | Precursor fiber density g/cm³ |
|---|---|---|---|---|---|---|---|---|
| Comparative example 11 | 3067 | 24000 | 0.06 | 0 | 0.06 | 0 | 5 | 1.21 |
| Example 12 | | | | 10 | 0.25 | 0.19 | 5 | 1.21 |
| Example 12 | | | | 20 | 0.45 | 0.39 | 5 | 1.21 |
| Example 13 | | | | 30 | 0.65 | 0.59 | 5 | 1.21 |
| Comparative example 12 | | | | 50 | 1.05 | 0.99 | 5 | 1.21 |
| Comparative example 21 | 1733 | 24000 | 0.06 | 0 | 0.06 | 0 | 5 | 1.21 |
| Example 21 | | | | 10 | 0.25 | 0.19 | 5 | 1.21 |
| Example 22 | | | | 20 | 0.45 | 0.39 | 5 | 1.21 |
| Example 23 | | | | 30 | 0.65 | 0.59 | 5 | 1.21 |
| Comparative example 22 | | | | 50 | 1.05 | 0.99 | 5 | 1.21 |
| Comparative example 31 | 3093 | 48000 | 0.06 | 0 | 0.06 | 0 | 5 | 1.21 |
| Example 31 | | | | 10 | 0.25 | 0.19 | 5 | 1.21 |
| Example 32 | | | | 20 | 0.45 | 0.39 | 5 | 1.21 |
| Example 33 | | | | 30 | 0.65 | 0.59 | 5 | 1.21 |
| Comparative example 32 | | | | 50 | 1.05 | 0.99 | 5 | 1.21 |
| Example 41 | 2800 | 24000 | 0.15 | 0 | 0.15 | 0 | 5 | 1.21 |
| Example 42 | | | | 10 | 0.40 | 0.25 | 5 | 1.21 |
| Example 43 | | | | 20 | 0.60 | 0.45 | 5 | 1.21 |
| Comparative example 41 | | | | 40 | 1.00 | 0.85 | 5 | 1.21 |
| Example 51 | 2800 | 24000 | 0.15 | 0 | 0.15 | 0 | 5 | 1.21 |
| Example 52 | | | | 10 | 0.40 | 0.25 | 5 | 1.21 |
| Example 53 | | | | 20 | 0.60 | 0.45 | 5 | 1.21 |
| Example 54 | | | | 30 | 0.80 | 0.65 | 5 | 1.21 |
| Comparative example 51 | | | | 40 | 1.00 | 0.85 | 5 | 1.21 |
| Example 61 | 2800 | 24000 | 0.15 | 0 | 0.15 | 0 | 5 | 1.21 |
| Example 62 | | | | 10 | 0.40 | 0.25 | 5 | 1.21 |
| Example 63 | | | | 20 | 0.60 | 0.45 | 5 | 1.21 |
| Example 64 | | | | 30 | 0.80 | 0.65 | 5 | 1.21 |
| Comparative example 61 | | | | 40 | 1.00 | 0.85 | 5 | 1.21 |
| Example 71 | 2800 | 24000 | 0.15 | 20 | 0.60 | 0.45 | 1 | 1.18 |
| Example 72 | | | | 20 | 0.60 | 0.45 | 3 | 1.19 |
| Example 73 | | | | 20 | 0.60 | 0.45 | 5 | 1.21 |
| Example 74 | | | | 20 | 0.60 | 0.45 | 5 | 1.21 |

| | Splice conditions Joining fiber | Tensile test | Throughput yield | |
|---|---|---|---|---|
| | linear | Entanglement strength per | Oxidization | Carbonization |

TABLE 1-continued

|  | Joining fiber | density tex | total linear density mN/tex | Process % | Process % |
|---|---|---|---|---|---|
| Comparative example 11 | Carbon fiber bundle | 3200 | 104 | 100 | 70 |
| Example 12 | | | 120 | 100 | 90 |
| Example 12 | | | 112 | 100 | 100 |
| Example 13 | | | 112 | 90 | 100 |
| Comparative example 12 | | | 80 | 40 | 100 |
| Comparative example 21 | Carbon fiber bundle | 1600 | 90 | 100 | 70 |
| Example 21 | | | 120 | 100 | 100 |
| Example 22 | | | 120 | 100 | 100 |
| Example 23 | | | 120 | 90 | 100 |
| Comparative example 22 | | | 90 | 40 | 100 |
| Comparative example 31 | Carbon fiber bundle | 3200 | 103 | 100 | 60 |
| Example 31 | | | 119 | 100 | 90 |
| Example 32 | | | 119 | 100 | 100 |
| Example 33 | | | 111 | 90 | 100 |
| Comparative example 32 | | | 48 | 40 | 100 |
| Example 41 | Carbon fiber bundle | 3200 | 108 | 100 | 80 |
| Example 42 | | | 125 | 100 | 90 |
| Example 43 | | | 67 | 90 | 100 |
| Comparative example 41 | | | 17 | 20 | 100 |
| Example 51 | Pre-carbonized fiber bundle | 2100 | 82 | 100 | 80 |
| Example 52 | | | 102 | 100 | 90 |
| Example 53 | | | 51 | 100 | 100 |
| Example 54 | | | 31 | 90 | 100 |
| Comparative example 51 | | | 20 | 40 | 100 |
| Example 61 | Oxidized fiber bundle | 3000 | 93 | 100 | 80 |
| Example 62 | | | 95 | 100 | 90 |
| Example 63 | | | 52 | 100 | 100 |
| Example 64 | | | 26 | 90 | 100 |
| Comparative example 61 | | | 17 | 40 | 100 |
| Example 71 | Carbon fiber bundle | 3000 | 103 | 90 | 90 |
| Example 72 | | | 103 | 100 | 100 |
| Example 73 | | | 95 | 100 | 100 |
| Example 74 | | | 121 | 90 | 90 |

Evaluation (1) Entanglement Strength

With an entanglement strength per joint fiber linear density of 25 mN/tex or more, the fiber bundles are less likely to come off the joining fiber bundle. When the quantity of an adhering oil agent was 0.85 wt % or less, the entanglement strength per joint fiber linear density was 25 mN/tex or more. A higher entanglement strength was achieved at a lower quantity of adhering oil agent. Also, the entanglement strength may be 50 mN/tex or more. Such a high entanglement strength is achieved more easily when a carbon fiber bundle is used as joining fiber bundle.

(2) Oxidization Process

The examples using 0.6 wt % or less of adhering oil agent have throughput yields of 90% or more. Examples 54 and 64 using 0.8 wt % adhering oil agent also have throughput yields of 90%.

(3) Carbonization Process

When the quantity of an adhering oil agent is 0.15 wt % or more, the throughput yield is 80% or more. When the quantity of an adhering oil agent is 0.2 wt % or more, the throughput yield is 90% or more.

In examples 1 to 3 using relatively low quantities of oiling agent adhering to the precursor fibers (0.06 wt %), less silicon oxide is produced than in examples 4 to 7 using relatively high quantities of oiling agent (0.15 wt %), and thus the time for apparatus cleaning during manufacture is shorter and the manufacturing efficiency is higher.

(4) Conclusion

As described above, when the quantity of an adhering oil agent is 0.15 to 0.85 wt %, the fiber bundles are less likely to come off the joining fiber bundle, thus achieving high throughput yields from both the oxidization process and the carbonization process. The reduced fastening trouble enables high productivity.

Modifications

1. Fiber Bundle

The fiber bundles used in one or more embodiments are carbon fiber bundles manufactured by oxidizing and carbonizing precursor fiber bundles. The fiber bundles may instead be oxidized fiber bundles manufactured by oxidizing precursor fiber bundles.

2. Joining

Although the upstream precursor fiber bundle and the joining fiber bundle are mainly described in one or more embodiments, the downstream precursor fiber bundle may be joined to the joining fiber bundle under the same conditions as or different conditions from the conditions for joining the upstream precursor fiber bundle to the joining fiber bundle. However, the quantity of the adhering oil agent (in total) may be 0.15 to 0.85 wt % for stable processes.

The invention claimed is:

1. A method for manufacturing an oxidized fiber bundle, the method comprising:
   joining an upstream precursor fiber bundle and a downstream precursor fiber bundle together with a joining fiber bundle; and
   oxidizing the joined precursor fiber bundles by feeding the joined precursor fiber bundles through an oxidation furnace,
   wherein the joining includes applying an oiling agent to a joint area of a joining target precursor fiber bundle before joining the joining target precursor fiber bundle and the joining fiber bundle together, and a quantity of the oiling agent adhering to the joint area is 0.15 to 0.85 wt %.

2. A method for manufacturing a carbon fiber bundle, the method comprising:
   joining an upstream precursor fiber bundle and a downstream precursor fiber bundle together with a joining fiber bundle;
   oxidizing the joined precursor fiber bundles by feeding the joined precursor fiber bundles through an oxidation furnace; and
   carbonizing the oxidized precursor fiber bundles,
   wherein the joining includes applying an oiling agent to a joint area of a joining target precursor fiber bundle before joining the joining target precursor fiber bundle and the joining fiber bundle together, and a quantity of the oiling agent adhering to the joint area is 0.15 to 0.85 wt %.

3. The method according to claim 2, further comprising:
   heat-treating the joining target precursor fiber bundle before joining the joining target precursor fiber bundle and the joining fiber bundle together and after applying the oiling agent.

4. The method according to claim 3, wherein
   the heat-treated joining target precursor fiber bundle has a density of 1.19 g/cm$^3$ or more.

5. The method according to claim 2, wherein
   the upstream precursor fiber bundle and the downstream fiber bundle are acrylic fiber bundles, and
   the joining fiber bundle is an oxidized fiber bundle or a carbon fiber bundle.

6. The method according to claim 3, wherein
   the upstream precursor fiber bundle and the downstream fiber bundle are acrylic fiber bundles, and
   the joining fiber bundle is an oxidized fiber bundle or a carbon fiber bundle.

7. The method according to claim 4, wherein
   the upstream precursor fiber bundle and the downstream fiber bundle are acrylic fiber bundles, and
   the joining fiber bundle is an oxidized fiber bundle or a carbon fiber bundle.

* * * * *